United States Patent
Bitzel, Jr. et al.

(10) Patent No.: US 8,620,033 B2
(45) Date of Patent: Dec. 31, 2013

(54) SURFACE MEASUREMENT SYSTEM AND METHOD

(75) Inventors: Raymond Bitzel, Jr., Newnan, GA (US); Johnathan Jones, Cartersville, GA (US)

(73) Assignee: Wheelabrator Group, Inc., Golden, CO (US)

( * ) Notice: Subject to any disclaimer, the term of this patent is extended or adjusted under 35 U.S.C. 154(b) by 274 days.

(21) Appl. No.: 13/171,516

(22) Filed: Jun. 29, 2011

(65) Prior Publication Data
US 2013/0002444 A1 Jan. 3, 2013

(51) Int. Cl.
*G06K 9/00* (2006.01)

(52) U.S. Cl.
USPC .......................................... 382/108

(58) Field of Classification Search
USPC .......................................... 382/108
See application file for complete search history.

(56) References Cited

U.S. PATENT DOCUMENTS

| | | | |
|---|---|---|---|
| 3,123,999 A | 3/1964 | Judd | |
| 3,544,774 A | 12/1970 | Peklenik | |
| 4,126,036 A | 11/1978 | Nilan et al. | |
| 4,145,140 A * | 3/1979 | Fujii | 356/512 |
| 4,914,828 A * | 4/1990 | Fiedor et al. | 33/554 |
| 5,581,483 A | 12/1996 | Thompson et al. | |
| 5,814,722 A | 9/1998 | Pratt et al. | |
| 5,873,770 A * | 2/1999 | Hashimoto | 451/32 |
| 6,507,393 B2 * | 1/2003 | Batchelder | 356/237.1 |
| 2002/0028636 A1 | 3/2002 | Koichi et al. | |
| 2008/0240510 A1 | 10/2008 | Dale et al. | |
| 2011/0013191 A1 | 1/2011 | Jung et al. | |

OTHER PUBLICATIONS

Instittue of Mechanical Systems, "Surface Profiler: Tencor P10" <<http://web.archive.org/web/20070707191103/http://www.zfm.ethz.ch/e/mems/eq_tencor.htm>>(downloaded from Internet Aug. 21, 2012) Jun. 13, 2006.
International Search Report and Written Opinion from corresponding PCT/US2012/043723 mailed Sep. 12, 2012.

* cited by examiner

*Primary Examiner* — Tom Y Lu
(74) *Attorney, Agent, or Firm* — Lando & Anastasi, LLP

(57) ABSTRACT

A surface measurement method includes inspecting a plurality of samples of a first irregular workpiece surface in two dimensions, determining, based on the inspections of the samples, a total number of surface peaks on each of the plurality of samples, and deriving a control limit from a statistical variation of the total number of surface peaks on each of the samples. The control limit specifies an out-of-tolerance condition for the total number of surface peaks on a second irregular workpiece surface. The method further includes inspecting a portion of the second irregular workpiece surface in two dimensions, determining, based on the inspection of the portion of the second irregular workpiece surface, a total number of surface peaks on the portion, and comparing the total number of surface peaks on the portion to the control limit to determine whether the second irregular workpiece surface is in the out-of-tolerance condition.

20 Claims, 8 Drawing Sheets

SURFACE MEASUREMENT SYSTEM AND METHOD

BACKGROUND OF THE INVENTION

1. Field of the Disclosure

This disclosure relates generally to the field of abrasive surface preparation, and more particularly to methods and apparatus for measuring the profile of a prepared surface.

2. Discussion of Related Art

Abrasive surface preparation is a process used to clean or condition the surface of a material, typically metal, to strengthen it, prepare it for receiving a coating, such as paint, or for other purposes. In one conventional technique, an abrasive media is blasted onto the surface under high pressure. The resulting profile of the prepared surface (i.e., the three-dimensional variations of the surface from a perfectly smooth or "true" plane) describes the relative roughness of the surface, and is known to be a factor in the performance of various coatings applied to metals, such as steel. One existing standard for quantifying surface irregularities is described by ANSI B46.1-2009: Surface Texture, Surface Roughness, Waviness and Lay (American Society of Mechanical Engineers, Aug. 20, 2010, ISBN 9780791832622).

Several known techniques for measuring surface profiles are described, for example, in ASTM International Book of Standards, Volume 06.02, Paint—Products and Applications; Protective Coatings; Pipeline Coatings, D4417 (Methods A, B and C). In ASTM D4417 Method A, a visual comparator (e.g., a template) is viewed in comparison with the surface being measured, usually with a magnifier. In Method B, a gauge having a needle or stylus is laid on top of the surface at various locations to measure the distance between the peaks and valleys of the surface. In Method C, a tape having a compressible foam layer is pressed onto a portion of the surface to make an impression of the profile, which is then measured with a spring micrometer.

Other known techniques are described in, for example, U.S. Patent Application Publication No. 2008/0240510, entitled "Method and System for Examining a Surface;" U.S. Pat. No. 5,581,483, entitled "Measurement of Shot Peening Coverage by Correlation Analysis of Surface Line Data;" U.S. Pat. No. 5,814,722, entitled "System for Measurement of Peaks on Surfaces;" U.S. Pat. No. 4,126,036, entitled "Surface Roughness Analyzer;" and U.S. Pat. No. 3,123,999, entitled "Apparatus for Measuring Surface Roughness Peaks."

BRIEF SUMMARY OF THE INVENTION

According to one embodiment of the present disclosure, a surface measurement method includes inspecting a plurality of samples of a first irregular workpiece surface in two dimensions, determining, based on the inspections of the samples, a total number of surface peaks on each of the plurality of samples, and deriving a control limit from a statistical variation of the total number of surface peaks on each of the samples. The control limit specifies an out-of-tolerance condition for the total number of surface peaks on a second irregular workpiece surface. The method further includes inspecting a portion of the second irregular workpiece surface in two dimensions, determining, based on the inspection of the portion of the second irregular workpiece surface, a total number of surface peaks on the portion, and comparing the total number of surface peaks on the portion to the control limit to determine whether the second irregular workpiece surface is in the out-of-tolerance condition.

In another embodiment, inspecting the samples of the first irregular workpiece surface in two dimensions may include optically inspecting the samples of the first irregular workpiece surface in two dimensions. Inspecting the portion of the second irregular workpiece surface in two dimensions may include optically inspecting the portion of the second irregular workpiece surface in two dimensions.

In another embodiment, the method may include alerting an operator in response to determining that the second irregular workpiece surface is in the out-of-tolerance condition. In yet another embodiment, alerting the operator may include at least one of illuminating a lighted warning indicator, sounding an audible alarm, and displaying an alert message in a user interface of an operator terminal.

In another embodiment, the method may include measuring an average height of the surface peaks on at least one of the plurality of samples, and correlating the total number of surface peaks on each of the plurality of samples to the average height such that a surface profile of the second irregular workpiece surface can be determined based on the total number of surface peaks on the portion of the second irregular workpiece surface. In yet another embodiment, the method may include determining the surface profile of the second irregular workpiece surface based on the correlation, wherein the surface profile represents an average roughness $R_a$ of the second irregular workpiece surface.

In another embodiment, the plurality of samples may include at least 100 samples of the first irregular workpiece surface. In yet another embodiment, the size of each of the samples may be approximately 0.04 inches square. In yet another embodiment, the control limit may be derived from a +/−3 sigma statistical variation of the total number of surface peaks on each of the plurality of samples.

According to one embodiment of the present disclosure, a surface measurement apparatus includes a sensing unit and a controller coupled to the sensing unit. The controller is configured to inspect, using the sensing unit, a plurality of samples of a first irregular workpiece surface in two dimensions; determine, based on the inspections of the samples, a total number of surface peaks on each of the samples; derive a control limit from a statistical variation of the total number of surface peaks on each of the samples, the control limit for specifying an out-of-tolerance condition for the total number of surface peaks on a second irregular workpiece surface; inspect, using the sensing unit, a portion of the second irregular workpiece surface in two dimensions; determine, based on the inspection of the portion, a total number of surface peaks on the portion; and compare the total number of surface peaks on the portion to the control limit to determine whether the second irregular workpiece surface is in the out-of-tolerance condition. Each of the plurality of samples has substantially the same size, and the portion has substantially the same size as one of the plurality of samples.

In another embodiment, the sensing unit may include a camera configured to capture an image of the portion of the first irregular workpiece surface and an image of the portion of the second irregular workpiece surface. In yet another embodiment, the sensing unit may include an inclinometer configured to determine an angle of the camera with respect to the portion of the irregular workpiece surface. In yet another embodiment, the sensing unit may include a proximity sensor configured to determine a distance between the camera and the first irregular workpiece surface, the second irregular workpiece surface, or both. In yet another embodiment, the sensing unit may include an illumination device configured to illuminate the first irregular workpiece surface, the second irregular workpiece surface, or both.

In another embodiment, the apparatus may include a user interface coupled to the controller. The user interface may be configured to alert an operator in response to the controller determining that the second irregular workpiece surface is in the out-of-tolerance condition. In yet another embodiment, the user interface may include a lighted warning indicator and/or an audible alarm.

In another embodiment, the controller may be configured to measure an average height of the surface peaks on at least one of the samples, and correlate the total number of surface peaks on each of the samples to the average height such that a surface profile of the second irregular workpiece surface can be determined based on the total number of surface peaks on the portion of the second irregular workpiece surface. In yet another embodiment, the controller may be configured to determine the surface profile of the second irregular workpiece surface based on the correlation, wherein the surface profile represents an average roughness $R_a$ of the second irregular workpiece surface. In yet another embodiment, the size of each of the samples of the first irregular workpiece surface may be approximately 0.04 inches square. In yet another embodiment, the sensing unit may be configured to enable a measurement of a height of at least one of the surface peaks of the first irregular workpiece surface.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways.

Also the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As discussed above, several techniques for measuring the profile of a surface are known. However, according to various embodiments of the present disclosure, it is appreciated that these known techniques are not well-suited for use in real-time production. For example, one disadvantage of the visual comparator is that, because not all surface profiles are the same, a highly experienced inspector must account for any differences, either real or perceived, between the comparator tool and the surface under inspection. Such inspection can be highly subjective to the inspector, and there is no analytical data collected from the inspection. In another example, one disadvantage of the handheld gauge with needle or stylus is that several measurements at different points on the surface must be made and averaged together to provide an accurate reading. This technique is also prone to error if the gauge is not precisely used. In yet another example, one disadvantage of the foam tape is that it can be costly and time consuming to take a sufficient number of surface measurements.

It is appreciated, therefore, that none of these known techniques takes advantage of a predictable correlation between a two-dimensional measurement of the surface and a statistical model that can be generated based on a relatively small number of control samples of the material, as disclosed herein. For example, according to one embodiment of the present disclosure, a non-contact measurement of a surface profile can be acquired through an optical inspection of the surface. Such an inspection can be made using, for example, a machine vision system. A correlation can be made, based on known properties of the material when subjected to a surface preparation technique, between the roughness of the workpiece surface and the number of peaks observed on the surface. Further, because the average peak-to-peak distance may be used to describe the profile of a surface, the correlation may be utilized to associate a peak count with the average peak-to-peak distance, and thus the average surface roughness (as quantified according to, e.g., ANSI standards). It is further appreciated that embodiments of the methods and apparatus disclosed herein can be automated for fast processing and used in a real-time production process with a relatively small amount of human intervention.

Figure 1:
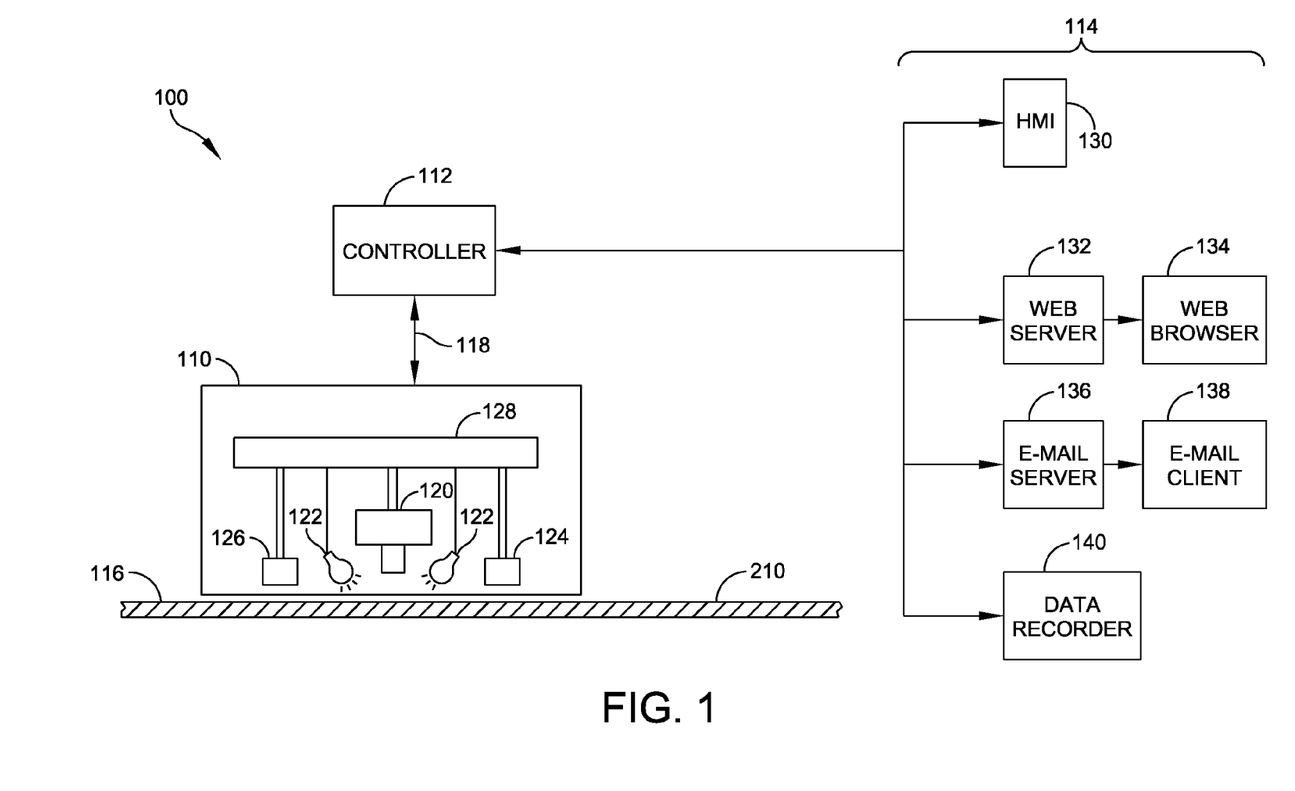
FIG. 1 is a block diagram of a surface profile measurement system in accordance with one embodiment of the present disclosure.

FIG. 1 illustrates a block diagram of a surface measurement system 100 in accordance with one embodiment of the present disclosure. The system 100 includes a sensing head 110, a controller 112, and one or more user interface systems 114. During operation, the sensing head 110 is positioned near a workpiece 116 (such as a piece of metal), which may move in relation to the sensing head 110 (e.g., on a conveyor). The sensing head 110 includes one or more of the following: a camera 120, one or more lamps 122 or other illumination devices, an inclinometer 124, and a proximity sensor 126 (e.g., an inductive proximity sensor, a double lensed LED ranging sensor, a laser ranging sensor, or other device configured to detect the presence and/or absence of a metal surface). Depending on the distance between the proximity sensor 126 and the workpiece 210, different ranging technology can be used. For example, an inductive proximity sensor is suitable for use when the distance is approximately one inch, and a double lensed LED or laser ranging sensor is suitable for use when the distance is approximately three inches. In some embodiments, the camera 120 and/or lamps 122 are incorporated within a conventional machine vision system having a separate programmable controller, as will be understood by one of skill in the art.

Each component of the sensing head 110 may be physically attached to a frame 128 or other supporting structure such that the camera 120, the lamps 122, the inclinometer 124, and/or the proximity sensor 126 remain in substantially fixed spatial relation and orientation to each other at all times. It should be understood that each element of the sensing head 110 may include an attachment feature that allows for adjusting the respective positions during, for example, setup or calibration procedures. The sensing head 110 is coupled to the controller 112 through one or more communication interfaces 118 that provide for the exchange of, among other things, control and monitor data (e.g., camera control, image acquisition, lighting control, sensor monitoring, and so forth). Additional interfaces (not shown) may also be included in the system 100 for providing power to the respective elements of the sensing head 110.

The camera 120 can be configured to inspect and identify features of the workpiece 116, including variations and irregularities of the workpiece surface, and to communicate data relating to the workpiece to the controller 112. For example, the camera 120 may be configured to acquire images of portions of the workpiece surface 210 (e.g., each portion having an area of approximately 0.04 square inches). As the sensing head 110 and/or the workpiece 116 move relative to one another, the camera 120 may acquire images of different portions of the surface 210. Thus, according to at least one embodiment, the system 100 can be used to measure the surface 210 in real-time as the workpiece 116 undergoes surface preparation. In one embodiment, the camera 120 is configured to detect surface variations at a resolution of at least approximately 11 microns or approximately 0.5 mills.

As described above, in at least one embodiment, the system 100 includes a non-contact surface measurement apparatus. The inclinometer 124 and the proximity sensor 126 enable the system 100 to identify the orientation of the sensing head 110 with respect to the workpiece 116 without physically touching the workpiece. The inclinometer 124 provides data to the controller 112 relating to the angle of the sensing head 110 with respect to gravity. This data is useful for, among other things, determining whether the sensing head 110 is correctly aligned with respect to the workpiece 116 (e.g., parallel to the surface). The proximity sensor 126 provides data to the controller 112 relating to the distance between the sensing head 110 and the surface of the workpiece 116. This data is also useful for alignment purposes.

The user interface system 114 is coupled to the controller 112. The user interface system 114 may include various types of devices and/or systems that are configured to communicate information to and from the controller 112, and enable one or more users of the system 100 to control, monitor, and otherwise interact with the controller. Examples of user interfaces that may be utilized include a Human-Machine Interface (HMI) (e.g., a graphical HMI such as a Fuji HMI—V815X, sold by Fuji Electric Corporation of America, Fremont, Calif.), a web server 132 and web browser 134, and/or an electronic mail (e-mail) server 136 and e-mail client 138. In one embodiment, the HMI executes software that enables secure communications (e.g., TELLUS and V-Server software, also sold by Fuji Electric Corp. of America). In one embodiment, a data recorder 140 may be coupled to the controller 112 for capturing and storing data generated by the system 100, such as data associated with the surface profile measurements. Such data may be subsequently retrieved by a user for further analysis or reporting purposes.

According to one embodiment, during normal operation of the system 100 the workpiece 116 undergoes a form of surface preparation, such as blasting, that is performed prior to inspection and measurement. Such preparation manipulates the surface of the workpiece 116 and causes the surface to acquire a profile that can be visualized as a set of peaks and valleys. Peaks are typically points of the surface that, when viewed in cross-section, are higher than an imaginary plane that is substantially parallel to the surface. The imaginary plane may be, for example, located at an average height of the surface between the highest and lowest points, or at another elevation. Likewise, valleys are typically points of the surface that are lower than the imaginary plane. Therefore, if an observer inspects the surface of the workpiece 116 at a substantially perpendicular angle to the imaginary plane (e.g., as viewed from above), the peaks will be closer to the observer than the valleys. Likewise, the highest peaks will be closer to the observer than the lowest peaks.

According to one embodiment, the system 100 can be used to inspect and measure the surface of the workpiece 116, for example, to determine if the surface profile is within desired specifications, control limits, or tolerances by identifying peaks and/or valleys on the surface. The system 100 may further be configured to identify surface variations and irregularities caused by other conditions occurring during surface preparation, such as vibration, temperature, wheel speed, and pressure. As will now be described, the peaks and valleys, which are identifiable by the camera 120 (or by a system that is configured to analyze the images generated by the camera), can be used to describe a characteristic of the workpiece 116 surface, such as roughness. Roughness can be quantified by the deviations of the surface from a perfectly smooth form. Large deviations may correspond to high roughness.

In one embodiment, it is appreciated that the surface profile of a particular material (e.g., steel or iron) will have predictable characteristics when subjected to preparation such as blasting. That is, the nature of the material is such that the surface can only be manipulated or distorted to a certain extent before it fractures, tears, or resists further manipulation by the surface preparation process (also referred to as overworking the surface). Therefore, the maximum slope between any adjacent peak and valley (or adjacent peaks, or adjacent valleys), which is the rate at which the elevation of the surface changes with respect to distance along the imaginary plane, can be calculated with a level of confidence that is sufficient for determining the average expected distance between any adjacent peaks and valleys for a given average roughness, or $R_a$. Accordingly, within any given area of the surface under inspection, there will be a predictable number of peaks present for a corresponding average roughness. Because there is a predictable relationship between the surface profile (e.g., roughness), the average distance between peaks, and the number of peaks on the portion of the surface being inspected, the surface profile of the workpiece 116 can be determined by counting the number of surface peaks found within a certain two dimensional view of the inspection area. For example, if the inspection area contains a high number of peaks, it can be said that the surface has a relatively rough (or high) profile (and a relatively small peak-to-peak distance), whereas if the number of peaks is relatively low, it can be said that the surface has a relatively smooth (or low) profile (and a relatively large peak-to-peak distance).

Figure 2A:
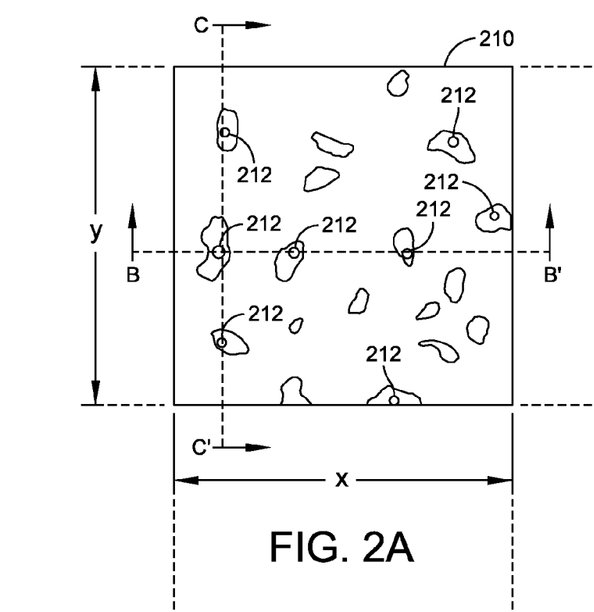
FIG. 2A is top view of a portion of a workpiece surface to be inspected in accordance with one embodiment of the present disclosure.
Figure 2B:
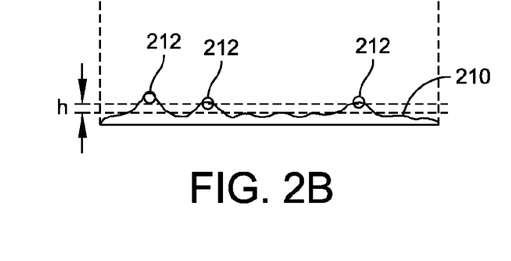
FIG. 2B is a cross-sectional elevation view taken along a cut line B-B' of FIG. 2A.
Figure 2C:
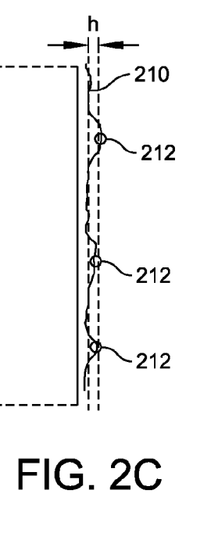
FIG. 2C is a cross-sectional elevation view taken along a cut line C-C' of FIG. 2B.

FIG. 2A is a two-dimensional top view a portion of an exemplary workpiece surface 210, such as would be observed by the camera 120 of FIG. 1. The area under inspection is x by y; although typically the area will be square, it need not be so. For example, the inspection area may be approximately 0.04 square inches (i.e., 0.2 inches by 0.2 inches). With the use of illumination and a camera or magnifier, such as described above with respect to the system 110 of FIG. 1, variations and irregularities in the workpiece surface 210 can be observed, for example, by a machine vision system, or by a human operator. Appearing on an image of the workpiece surface 210 are one or more surface peaks at or above a threshold height h, each indicated at 212. FIG. 2B shows a cross-section of the workpiece surface 210 along a cut line B-B' showing the corresponding peaks 212 along the cross-section. FIG. 2C shows another cross-section of the workpiece surface 210 along a cut line C-C' showing the corresponding peaks 212 along the cross-section. Each peak 212 may be identified by inspection based on the height of the peak relative to other points on the surface using known image processing techniques. In other words, the threshold height h may be established at or above which each peak is identified and counted and below which no peak is observed or counted.

According to one embodiment, the threshold height can be established as the average height of the surface above the lowest point, although it should be understood that other factors may be used to determine the threshold height. For example, some peaks may be insufficiently high for properly characterizing the surface profile, and therefore should be discounted or ignored. In the example workpiece surface 210 of FIG. 2A, there are seven peaks, each identified at 212, at or above the threshold height.

Figure 3:
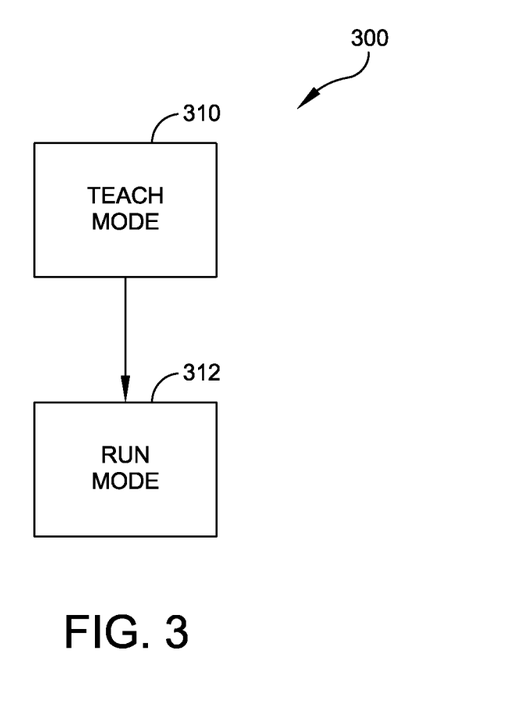
FIG. 3 is a flow diagram of a surface measurement process in accordance with one embodiment of the present disclosure.

FIG. 3 is a flow diagram of a surface measurement process 300, according to one embodiment. The system 100 of FIG. 1 can operate in at least two modes: Teach Mode 310 and Run Mode 312, each of which are described in further detail below with respect to FIGS. 4 and 5, respectively. Initially, once the sensing head 110 is installed and configured, the system 100 enters Teach Mode 310. During or prior to Teach Mode 310, the surface of the workpiece 116 is prepared, such as by blasting or peening, under controlled conditions prior to measurement by the system 100. The controls may include separate, periodic inspections (e.g., by an operator) to ensure that the process is continuously under control; if the process is out of control, the Teach Mode 310 may need to be restarted. During Teach Mode 310, the prepared surface is inspected, either automatically or by hand, as part of a configuration procedure that "teaches" the system 100 various measurement parameters that are subsequently used for real-time measurement of the workpiece 116. Once the system 100 has completed Teach Mode 310, the system 100 enters Run Mode 312.

Figure 4:
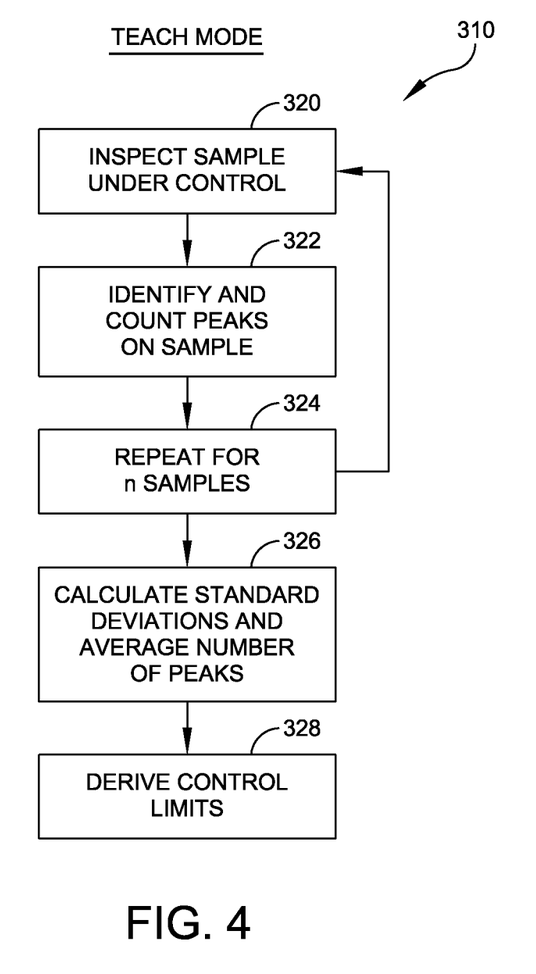
FIG. 4 is another flow diagram, showing details of the surface measurement process of FIG. 3, in accordance with one embodiment of the present disclosure.

FIG. 4 is a flow diagram of the surface measurement process 300, described above with respect to FIG. 3, while operating in Teach Mode 310, according to one embodiment. At block 320, a sample of the workpiece 116 surface is inspected. The sample should have substantially the same area as, or sufficiently represent, each subsequent sample. The camera 120 acquires an image of the sample, and sends it to the controller 112 for analysis. It should be understood that in some embodiments, the camera 120 can be part of a machine vision system, which may include a separate controller for analyzing the image; in some other embodiments, image processing can be performed by the controller 112, or by a similar processing device.

At block 322, the controller 112 identifies and counts each peak on the sample. Blocks 320 and 322 may be repeated for any number of different samples n (i.e., one or more samples), as indicated at block 324. For example, one hundred (100) samples may be analyzed during the Teach Mode 310 process. The number of samples that should be taken in Teach Mode 310 to achieve desirable results may be determined by statistical analysis.

At block 326, the standard deviation and the average of the number of peaks counted in each sample is calculated. At block 328, one or more control limits are calculated based on the standard deviation, the average, or both. For example, a statistical model may be derived based on the standard deviation, the average, or both, in which a +/−3-sigma deviation may be calculated, as should be understood by one of skill in the art. The control limit(s) may be based on the corresponding +/−3-sigma values. In another example, a statistical process control is applied around a known variable (e.g., related to a customer part number), which includes all known process variations associated with the variable. This enables a mathematical model of process control limits (e.g., that are used during a surface preparation process) to be built that accounts for the inherent variations of the prepared surface of a particular part. For example, a wide variation will cause the control points to be widely spread. The mathematical model also enables a user to determine how capable and repeatable the surface preparation process will be. The control limits will be used during the Run Mode 312, as described below.

Figure 5:
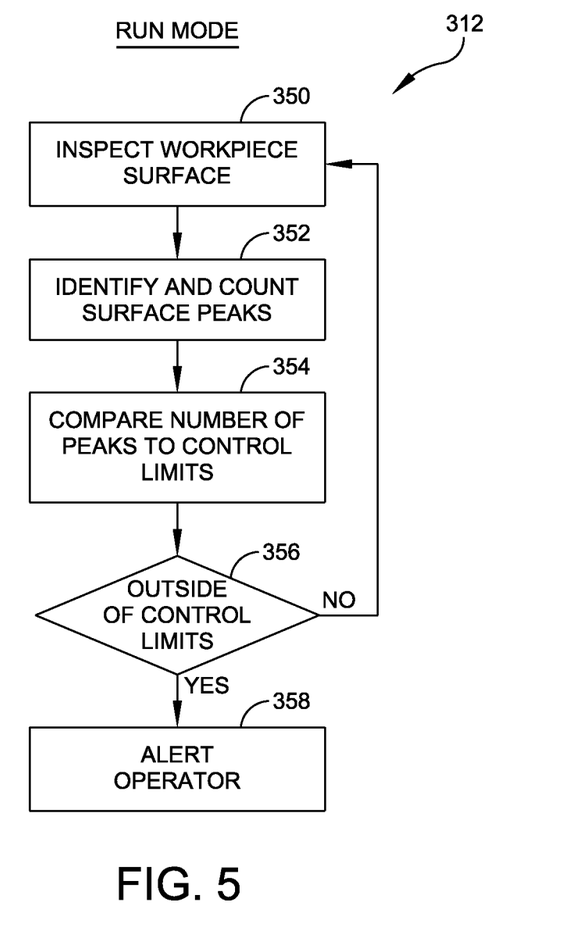
FIG. 5 is yet another flow diagram, showing further details of the surface measurement process of FIG. 3, in accordance with one embodiment of the present disclosure.

FIG. 5 is a flow diagram of the surface measurement process 300, described above with respect to FIG. 3, while operating in Run Mode 312, according to one embodiment. At block 350, an area of the workpiece 116 surface is inspected. The area should have substantially the same area as or representative of each of the samples inspected during the Teach Mode process 310. The camera 120 acquires an image of the sample, and sends the image to the controller 112 (or other processor) for analysis. At block 352, each surface peak in the image is identified and counted. At block 354, the number of peaks counted within the inspection area is compared to one or more of the previously derived control limits, for example, +/−3-sigma, which can be used to define a tolerance range. At block 356, if the number of peaks is outside of the control limits (e.g., it is above an upper limit or below a lower limit), the workpiece 116 is in an out-of-tolerance condition and an operator is alerted (block 358). Otherwise, the process 312 may continue at block 350 by inspecting a different area of the workpiece 116 surface. Process 312 may continue indefinitely or until a pre-defined condition occurs (e.g., operator intervention).

It should be understood that the operator alert described at block 350 may take on various different forms. For example, the operator may be alerted by a series of indicator lamps located proximate to the surface preparation machine, by a message on the HMI 130, by a display on the web browser 134, and/or by an e-mail message on the e-mail client 138. In one example, if the peak count for a single surface inspection area is outside of the control limits, a green indicator light will change to yellow. The lamp may also flash to attract the operator's attention. In another example, if the peak count for several different surface inspection areas is outside of the control limits within 60 seconds of one another, the lamp will change from yellow to red. Additionally, an audible alarm may sound to further attract the operator's attention. Other contingency responses may be automatically performed, for example, to automatically stop the surface preparation machine. Once alerted, the operator may take subsequent action to determine whether the workpiece 116 surface is in an out-of-tolerance condition, such as by hand measurements using other techniques, or by re-calibration of the system 100.

Figure 6:
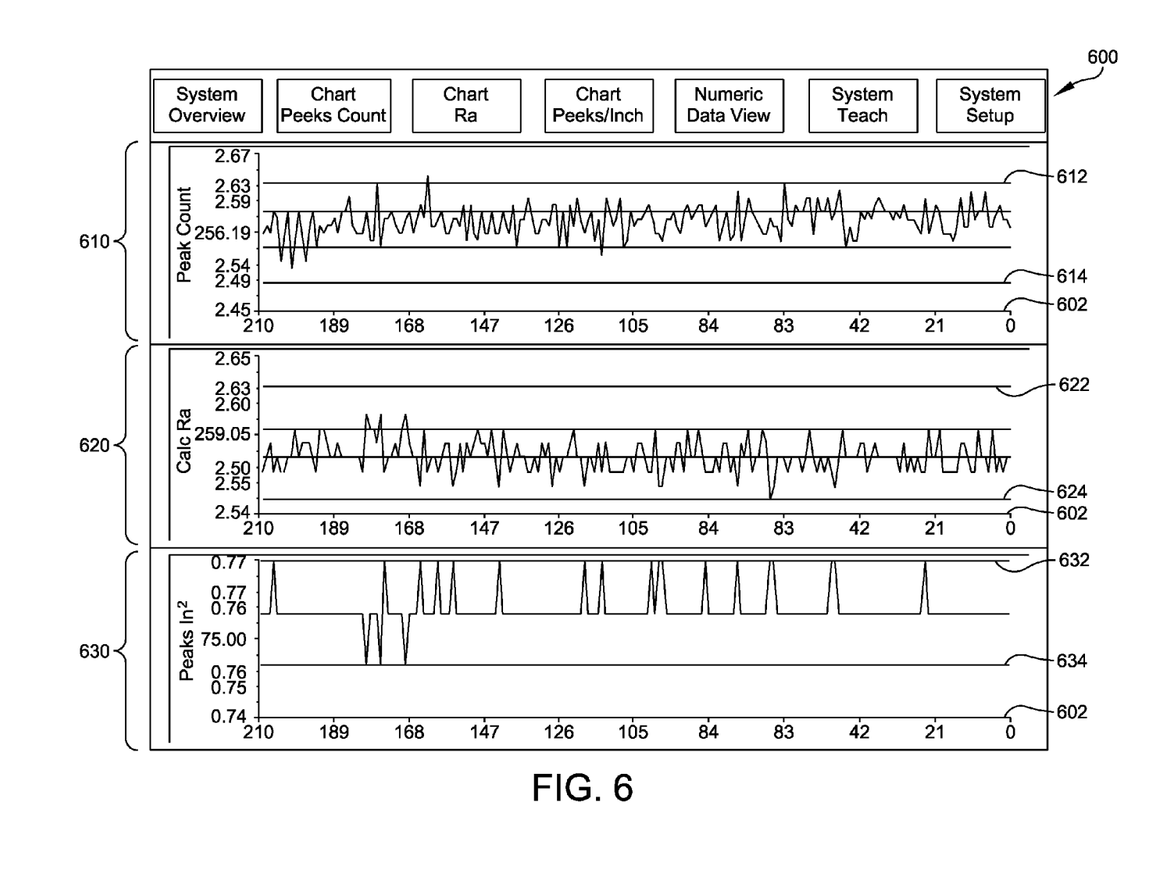
FIG. 6 illustrates a user interface for displaying process data generated by the system of FIG. 1 in accordance with one embodiment of the present disclosure.

FIG. 6 illustrates a user interface 600 for displaying process data generated by the system 100 of FIG. 1, according to one embodiment. At least three types of data may be displayed, for example, along a timeline 602 that is updated in real-time while the process 300 of FIGS. 3-5 is executing. One type of data that may be displayed in the user interface 600 is peak count data 610, which represents the number of peaks that are counted in each surface inspection area. Also shown are an upper control limit 612 and a lower control limit 614. The upper and lower control limits 612 and 614 may, for example, represent +/−3-sigma limits derived during the Teach Mode process 310.

Another type of data that may be displayed in the user interface 600 is a calculated average roughness 620, or $R_a$, that is a quantified representation of the surface profile of the workpiece 116. Also shown are an upper control limit 622 and a lower control limit 624. The upper and lower control limits 622 and 624 may, for example, represent +/−3-sigma limits derived during the Teach Mode process 310.

Yet another type of data that may be displayed in the user interface 600 is a number of peaks per square inch 630. Also shown are an upper control limit 632 and a lower control limit 634. The upper and lower control limits 632 and 634 may, for example, represent +/−3-sigma limits derived during the Teach Mode process 310.

Figure 7A:
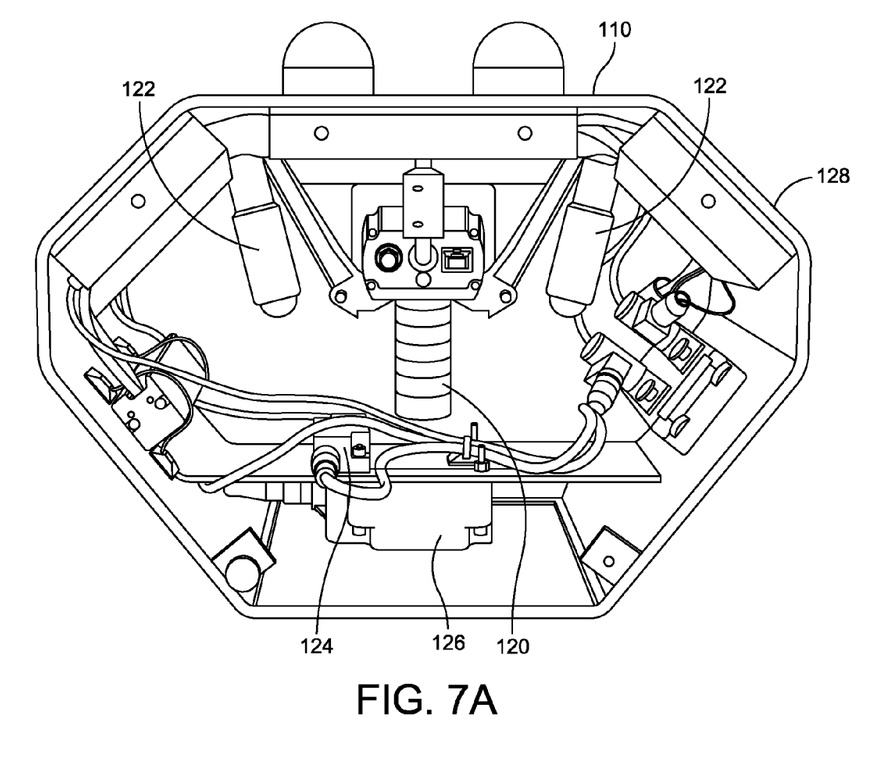
FIGS. 7A and 7B are side elevation and bottom views, respectively, of a sensing head device in accordance with one embodiment of the present disclosure.
Figure 7B:
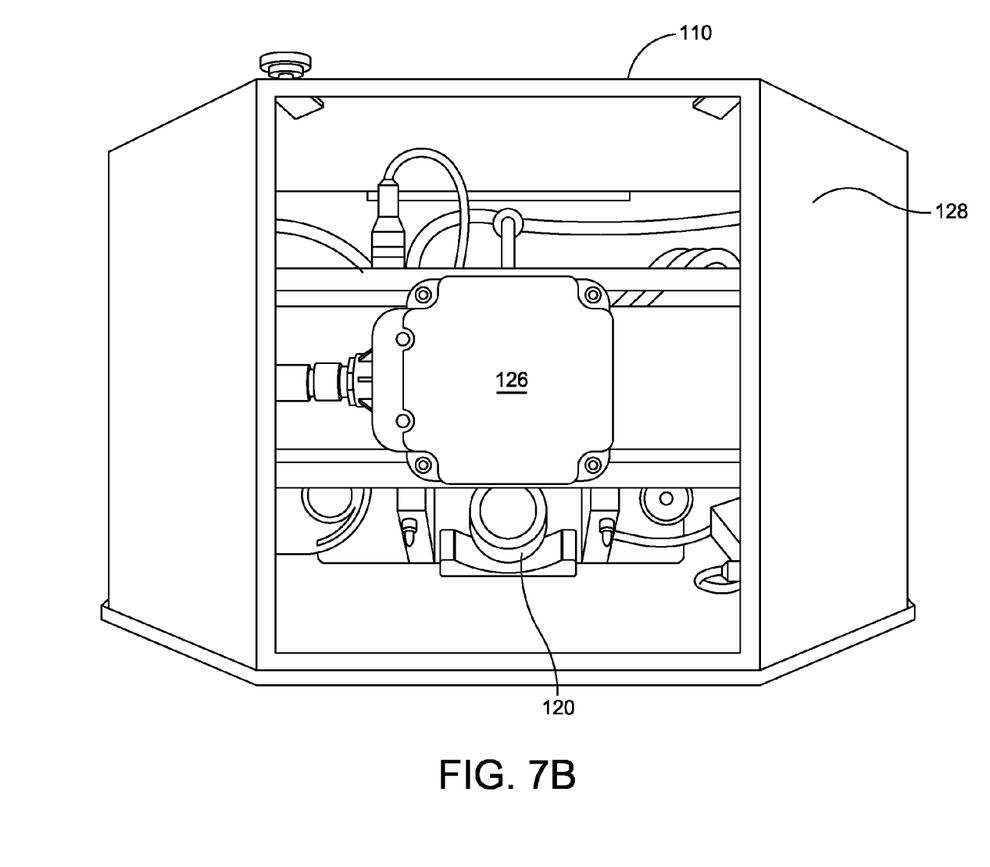

FIGS. 7A and 7B show one embodiment of a sensing head, such as the sensing head 110 of FIG. 1. FIG. 7A is a side view and FIG. 7B is a bottom view. The sensing head 110 includes the frame 128 supporting the camera 120, lamps 122, the inclinometer 124, and the proximity sensor 126. The sensing head 110 may be positioned such that the workpiece 116 is substantially parallel to the bottom of the sensing head such that the camera is aimed toward the surface 210 of the workpiece 116 and the proximity sensor is substantially parallel to the surface. The inclinometer 124 may be used to ensure that the above described orientations of the sensing head 110 correspond to the orientation of the workpiece 116.

Various aspects and functions in accordance with the present disclosure, including the user interface 600 shown in FIG. 6, may be implemented as specialized hardware or software executing in one or more special purpose or general purpose computer systems. Such computer systems may include a processor that performs a series of instructions that result in manipulated data. The processor may be a commercially available processor such as an Intel Pentium, Motorola PowerPC, SGI MIPS, Sun UltraSPARC, or Hewlett-Packard PARISC processor, but may be any type of processor or controller as many other processors and controllers are available. The computer system may include specially-programmed, special-purpose hardware, for example, an application-specific integrated circuit (ASIC) tailored to perform a particular operation disclosed herein. Other embodiments may perform the same function using a general purpose computing device.

The computer system may include an operating system that manages at least a portion of the hardware elements included in the computer system. Usually, a processor or controller executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and the embodiments disclosed herein are not intended to be limited to any particular implementation.

The processor and operating system together define a computer platform for which application programs in high level programming languages may be written. These component applications may be executable, intermediate, for example, C−, bytecode or interpreted code, which communicates over a communication network, for example, the Internet, using a communication protocol, for example, TCP/IP. Similarly, aspects in accord with the present disclosure may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the present disclosure may be implemented in a non-programmed environment, for example, documents created in HTML, XML or other format that, when viewed in a window of a browser program, render aspects of a graphical-user interface or perform other functions. Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used. Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A surface measurement method using a computer system, comprising:
   inspecting a plurality of samples of a first irregular workpiece surface in two dimensions, each of the plurality of samples having substantially the same size;
   determining with the computer system, based on the inspections of the samples, a total number of surface peaks on each of the plurality of samples;
   deriving a control limit with the computer system from a statistical variation of the total number of surface peaks on each of the plurality of samples, the control limit for specifying an out-of-tolerance condition for the total number of surface peaks on a second irregular workpiece surface;
   inspecting a portion of the second irregular workpiece surface in two dimensions, the portion having substantially the same size as one of the plurality of samples;
   determining with the computer system, based on the inspection of the portion of the second irregular workpiece surface, a total number of surface peaks on the portion; and
   comparing with the computer system the total number of surface peaks on the portion to the control limit to determine whether the second irregular workpiece surface is in the out-of-tolerance condition.

2. The method of claim 1, wherein inspecting the plurality of samples of the first irregular workpiece surface in two dimensions includes optically inspecting the plurality of samples of the first irregular workpiece surface in two dimensions, and wherein inspecting the portion of the second irregular workpiece surface in two dimensions includes optically inspecting the portion of the second irregular workpiece surface in two dimensions.

3. The method of claim 1, further comprising alerting an operator in response to determining that the second irregular workpiece surface is in the out-of-tolerance condition.

4. The method of claim 3, wherein alerting the operator includes at least one of illuminating a lighted warning indicator, sounding an audible alarm, and displaying an alert message in a user interface of an operator terminal.

5. The method of claim 1, further comprising measuring an average height of the surface peaks on at least one of the plurality of samples, and correlating the total number of surface peaks on each of the plurality of samples to the average height such that a surface profile of the second irregular workpiece surface can be determined based on the total number of surface peaks on the portion of the second irregular workpiece surface.

6. The method of claim 5, further comprising determining the surface profile of the second irregular workpiece surface based on the correlation, wherein the surface profile represents an average roughness $R_a$ of the second irregular workpiece surface.

7. The method of claim 1, wherein the plurality of samples includes at least 100 samples of the first irregular workpiece surface.

8. The method of claim 1, wherein the size of each of the samples is approximately 0.04 inches square.

9. The method of claim 1, wherein the control limit is derived from a +/−3 sigma statistical variation of the total number of surface peaks on each of the plurality of samples.

10. A surface measurement apparatus, comprising:
a sensing unit; and
a controller coupled to the sensing unit and configured to:
    inspect, using the sensing unit, a plurality of samples of a first irregular workpiece surface in two dimensions, each of the plurality of samples having substantially the same size;
    determine, based on the inspections of the samples, a total number of surface peaks on each of the plurality of samples;
    derive a control limit from a statistical variation of the total number of surface peaks on each of the plurality of samples, the control limit for specifying an out-of-tolerance condition for the total number of surface peaks on a second irregular workpiece surface;
    inspect, using the sensing unit, a portion of the second irregular workpiece surface in two dimensions, the portion having substantially the same size as one of the plurality of samples;
    determine, based on the inspection of the portion, a total number of surface peaks on the portion; and
    compare the total number of surface peaks on the portion to the control limit to determine whether the second irregular workpiece surface is in the out-of-tolerance condition.

11. The apparatus of claim 10, wherein the sensing unit includes a camera configured to capture an image of the portion of the first irregular workpiece surface and an image of the portion of the second irregular workpiece surface.

12. The apparatus of claim 11, wherein the sensing unit includes an inclinometer configured to determine an angle of the camera with respect to the portion of the irregular workpiece surface.

13. The apparatus of claim 11, wherein the sensing unit includes a proximity sensor configured to determine a distance between the camera and at least one of the first irregular workpiece surface and the second irregular workpiece surface.

14. The apparatus of claim 11, wherein the sensing unit includes an illumination device configured to illuminate at least one of the first irregular workpiece surface and the second irregular workpiece surface.

15. The apparatus of claim 10, further comprising a user interface coupled to the controller configured to alert an operator in response to the controller determining that the second irregular workpiece surface is in the out-of-tolerance condition.

16. The apparatus of claim 15, wherein the user interface includes a lighted warning indicator and an audible alarm.

17. The apparatus of claim 10, wherein the controller is further configured to measure an average height of the surface peaks on at least one of the plurality of samples, and correlate the total number of surface peaks on each of the plurality of samples to the average height such that a surface profile of the second irregular workpiece surface can be determined based on the total number of surface peaks on the portion of the second irregular workpiece surface.

18. The apparatus of claim 17, wherein the controller is further configured to determine the surface profile of the second irregular workpiece surface based on the correlation, wherein the surface profile represents an average roughness $R_a$ of the second irregular workpiece surface.

19. The apparatus of claim 10, wherein the size of each of the samples of the first irregular workpiece surface is approximately 0.04 inches square.

20. The apparatus of claim 10, wherein the sensing unit is configured to enable a measurement of a height of at least one of the surface peaks of the first irregular workpiece surface.

* * * * *